(12) United States Patent
Burke et al.

(10) Patent No.: US 10,780,843 B2
(45) Date of Patent: Sep. 22, 2020

(54) METHODS FOR FORMING AND TUNING THE DURABILITY OF BREAKAWAY SECTIONS ON A TRIM PANEL

(71) Applicant: Toyota Motor Engineering & Manufacturing North America, Inc., Erlanger, KY (US)

(72) Inventors: David M. Burke, Farmington, MI (US); Jaime N. Moore, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 79 days.

(21) Appl. No.: 15/883,338

(22) Filed: Jan. 30, 2018

(65) Prior Publication Data

US 2019/0232888 A1    Aug. 1, 2019

(51) Int. Cl.
  *B29C 37/00* (2006.01)
  *B29C 59/00* (2006.01)
  (Continued)

(52) U.S. Cl.
  CPC ...... *B60R 13/0206* (2013.01); *B29C 37/0057* (2013.01); *B29C 59/007* (2013.01); *B60R 13/0243* (2013.01); *B60R 21/0428* (2013.01); *B60R 21/2165* (2013.01); *B62D 65/14* (2013.01); *B60R 2013/0287* (2013.01); *B60R 2013/0293* (2013.01)

(58) Field of Classification Search
  CPC ..... B29C 33/0033; B29C 33/34; B29C 33/42; B29C 33/424; B29C 37/0057; B29C 39/22; B29C 45/376; B29C 45/372; B29C 45/5675; B29C 48/2566; B29C 51/082; B29C 51/428; B29C 51/32; B29C 59/007; B60R 21/2165; B60R 21/0428; B29K 2055/02; B29K 2105/12
  See application file for complete search history.

(56) References Cited

U.S. PATENT DOCUMENTS 5,256,354 A * 10/1993 Chadwick ........... B29C 37/0057
                                                                264/119
8,336,910 B1    12/2012 Kalisz et al.
(Continued)

FOREIGN PATENT DOCUMENTS

WO    2001040667 A1    6/2001

*Primary Examiner* — Gregory A Blankenship
(74) *Attorney, Agent, or Firm* — Christopher G. Darrow; Darrow Mustafa PC

(57) ABSTRACT

Doors for motor vehicles include door trim panel assemblies having multiple door trim panels held together at attachment points. A door trim panel includes a weakened perimeter formed from a series of apertures in the panel, creating a predetermined breakaway point where the assembly will rupture in the event a load is applied. Methods for tuning the durability of a trim panel assembly include a repeatable cycle in which pins are selected and inserted in a mold at varying positions. During injection molding, the pins form apertures to create a predetermined breakaway point. Changing the size, shape, and location of the pins allows tuning of the durability and properties of the breakaway point. Injection molds have variable pin placement capability to facilitate the method.

9 Claims, 7 Drawing Sheets

(51) Int. Cl.
    *B60R 21/2165*     (2011.01)
    *B60R 21/04*     (2006.01)
    *B60R 13/02*     (2006.01)
    *B62D 65/14*     (2006.01)

(56) References Cited

U.S. PATENT DOCUMENTS

| | | |
|---|---|---|
| 8,973,961 B1 | 3/2015 | Setsuda et al. |
| 9,517,727 B2 | 12/2016 | Tiboni et al. |
| 9,827,920 B2 | 11/2017 | Sanchez Cruz et al. |
| 2003/0020202 A1* | 1/2003 | Ueno .................. B29C 45/5675 264/163 |
| 2006/0284401 A1* | 12/2006 | Yamada .............. B60R 21/2165 280/728.3 |
| 2008/0128943 A1* | 6/2008 | Hager ................ B29C 45/1635 264/251 |
| 2010/0272955 A1 | 10/2010 | Chimelak et al. |
| 2012/0038133 A1* | 2/2012 | Kalisz ..................... B29C 33/42 280/728.3 |
| 2013/0134693 A1* | 5/2013 | Tromp .................. B60R 21/216 280/728.3 |
| 2014/0178518 A1* | 6/2014 | Cook .................. B29C 45/2673 425/183 |
| 2016/0137154 A1 | 5/2016 | Sasu et al. |
| 2016/0144562 A1* | 5/2016 | Twork ................ B29C 45/1704 264/504 |
| 2018/0085983 A1* | 3/2018 | Osborne .............. B29C 45/376 |
| 2018/0201218 A1* | 7/2018 | Zhang .................... B29C 69/00 |
| 2019/0143553 A1* | 5/2019 | Matsuno ............. B26D 7/1827 |
| 2019/0193662 A1* | 6/2019 | Zhang .................... B32B 27/40 |
| 2019/0225179 A1* | 7/2019 | Nogaret ................ B60R 21/215 |
| 2019/0232888 A1* | 8/2019 | Burke ................ B60R 13/0206 |

\* cited by examiner

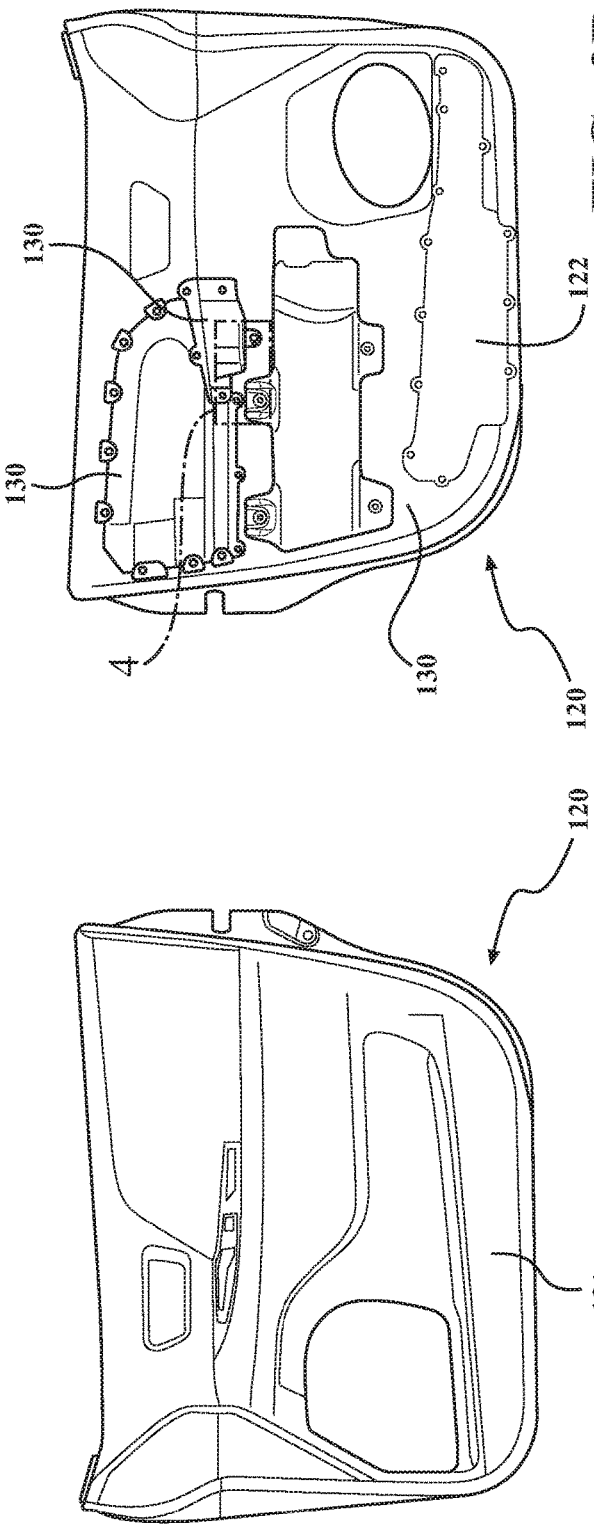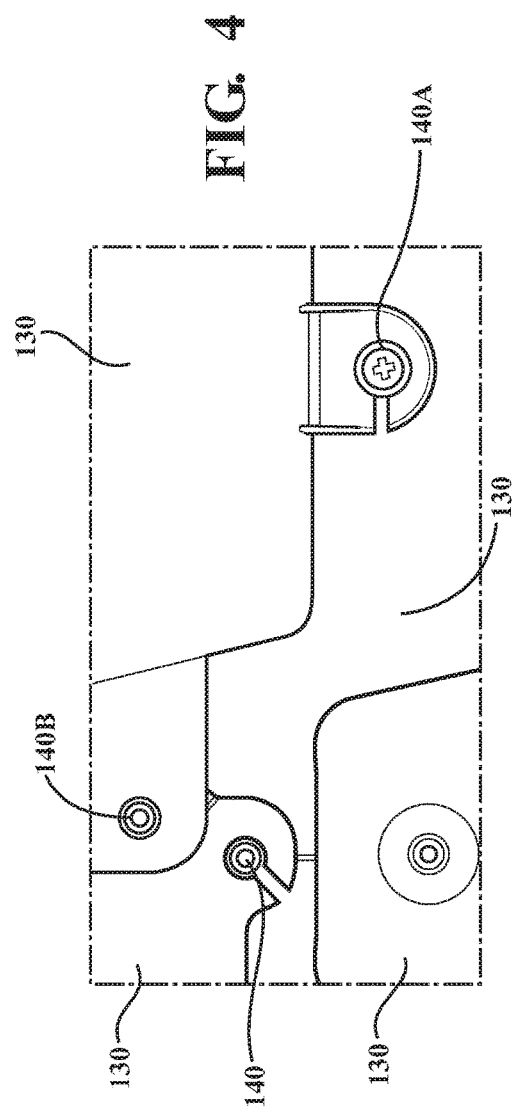

US 10,780,843 B2

METHODS FOR FORMING AND TUNING THE DURABILITY OF BREAKAWAY SECTIONS ON A TRIM PANEL

TECHNICAL FIELD

The present disclosure generally relates to trim for a vehicle interior and, more particularly, to trim designs and methods for making trim that enable predictable break patterns when the trim experiences a load.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Substantial portions of a vehicle interior are covered with trim panels formed of various plastics and other materials. This trim can be broken during an accident. It is desirable that trim break in a predictable and controlled manner when exposed to a load, such as an impact from an outside object that would be experienced during a collision, or by a secondary force such as when a trim panel assembly strikes an object in a vehicle interior.

SUMMARY

This section provides a general summary of the disclosure, and is not a comprehensive disclosure of its full scope or all of its features.

In various aspects, the present teachings provide a door for a motor vehicle. The door includes a door trim panel assembly having a first trim panel, a second trim panel, and at least one attachment point comprising an attachment mechanism for securing the first and second trim panels to one another at the attachment point. The door further includes a plurality of apertures in the first trim panel, forming a weakened perimeter in the first trim panel around the at least one attachment point and configured to create a pre-determined breakaway adjacent to the attachment point if the first trim panel is exposed to a load.

In other aspects, the present teachings provide a method for tuning the durability of a pre-determined breakaway line on a trim panel. The method includes a repeatable cycle, having a step of selecting a plurality of pins for forming apertures in the trim panel. The repeatable cycle also includes a step of choosing a perimeter pattern corresponding to a desired geometric pattern of the weakened perimeter in the trim panel. The repeatable cycle also includes steps of inserting the pins into a mold according to the perimeter pattern; injection molding the trim panel by injecting a molten thermoplastic resin into the mold; and testing the trim panel for a desired break property. The method includes a step of selecting a perimeter pattern corresponding the trim panel found to have the desired break property.

In still other aspects, the present teachings provide an interior trim panel assembly for a motor vehicle. The trim panel assembly includes a first trim panel, a second trim panel, and at least one attachment point comprising an attachment mechanism for securing the first and second trim panels to one another at the attachment point. The door further includes a plurality of apertures in the first trim panel, forming a weakened perimeter in the first trim panel around the at least one attachment point and configured to create a pre-determined breakaway adjacent to the attachment point if the first trim panel is exposed to a load.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIGS. 3A and 3B are plan views of front and back sides, respectively, of a door trim panel assembly of the door of FIGS. 1 and 2;

FIG. 4 is a magnified view of a portion of the back side of the door trim panel assembly of FIG. 3, highlighting attachment points of several trim panels;

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

Trim assemblies of the present disclosure have pre-set break points facilitating predictable break patterns in the event of receiving a load above a pre-determined threshold, such as during a vehicle collision. Methods of making trim assemblies allow for rapid optimization of such break points.

Trim assemblies of the present disclosure may be formed of multiple panels that are held together at attachment points. Perforated perimeters surrounding these attachment points serve as breakaway lines, otherwise referred to as crack propagation paths, at which the assembly will break in the event of receiving a load that exceeds the failure point of a panel or the assembly. Methods for making and optimizing a trim panel include injection molding to a die having a plurality of pins, each pin corresponding to a perforation in a panel. A given configuration can include parameters of pin shape, pin size, and pin placement. A cycle of manufacture and testing includes making the panel with the above-described method, and testing the panel. The cycle can optionally be repeated using different configurations of parameters such as pin shape, pin size, and pin placement.

Figure 2:
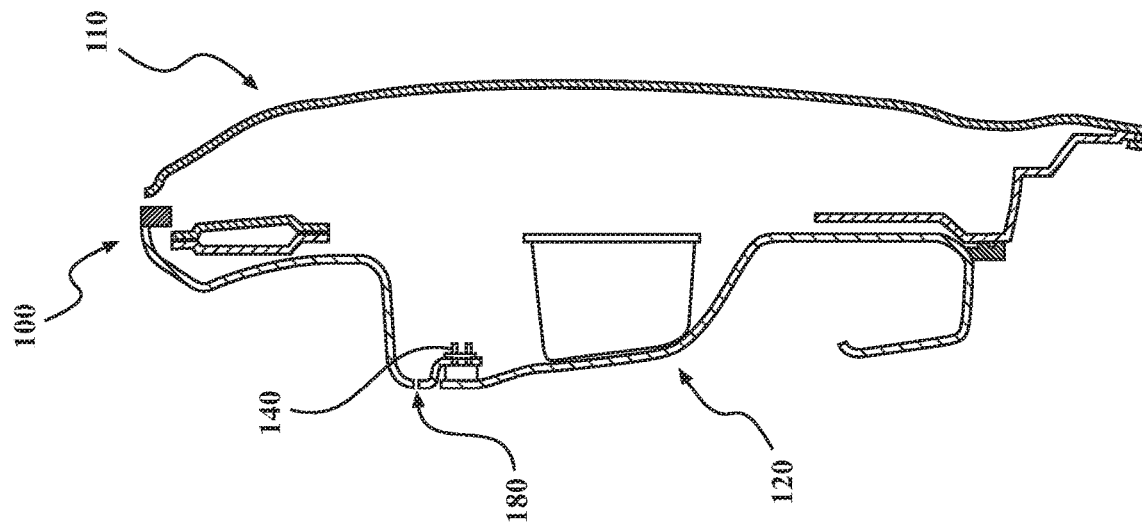
FIG. 2 is a cross sectional view of the door of FIG. 1, taken along the line 2-2.
Figure 1:
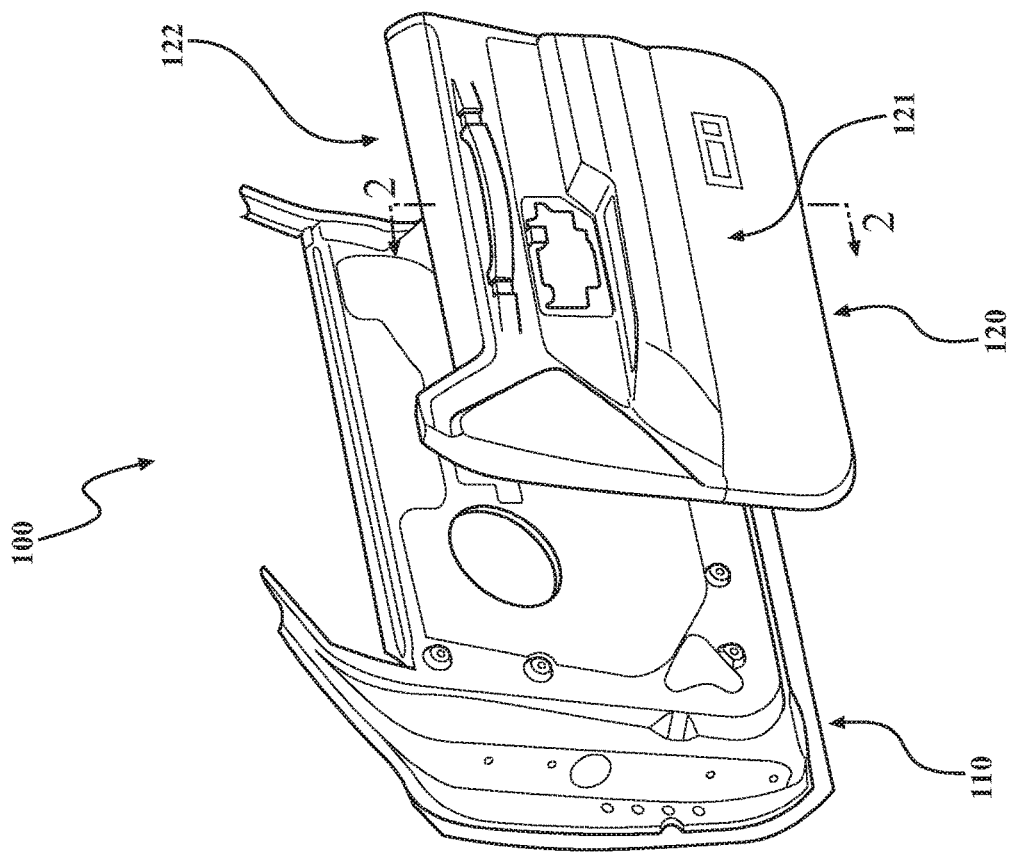
FIG. 1 is an exploded, perspective view of an exemplary passenger door for a motor vehicle.

FIG. 1 shows an exploded perspective view of an exemplary passenger door 100 for a motor vehicle, while FIG. 2 shows a cross-sectional view of the door of FIG. 1 taken along the line 2-2. The door 100 for can include an outer door 110, such as a door panel or skin, and a trim assembly 120 that can be attached, directly or indirectly, to the outer door 110. When incorporated into a vehicle, the outer door 110 will generally face outside the vehicle and the trim assembly will generally face the vehicle interior. In some implementations, a trim assembly 120 of the present disclosure stands alone.

FIGS. 3A and 3B show plan views of front and back sides, respectively, of the door trim panel assembly 120 of the door 100 of FIGS. 1 and 2. The trim assembly 120 as disclosed herein can be formed of multiple trim panels 130. In general, a trim assembly 120 will include at least two trim panels 130 that, in certain implementations herein, can be referred to as first and second trim panels 130. It should be understood that when first and second trim panels 130 are referenced hereinafter, this does not imply that a trim assembly 120 necessarily only includes first and second trim panels 130, but can include more than two.

Figure 5:
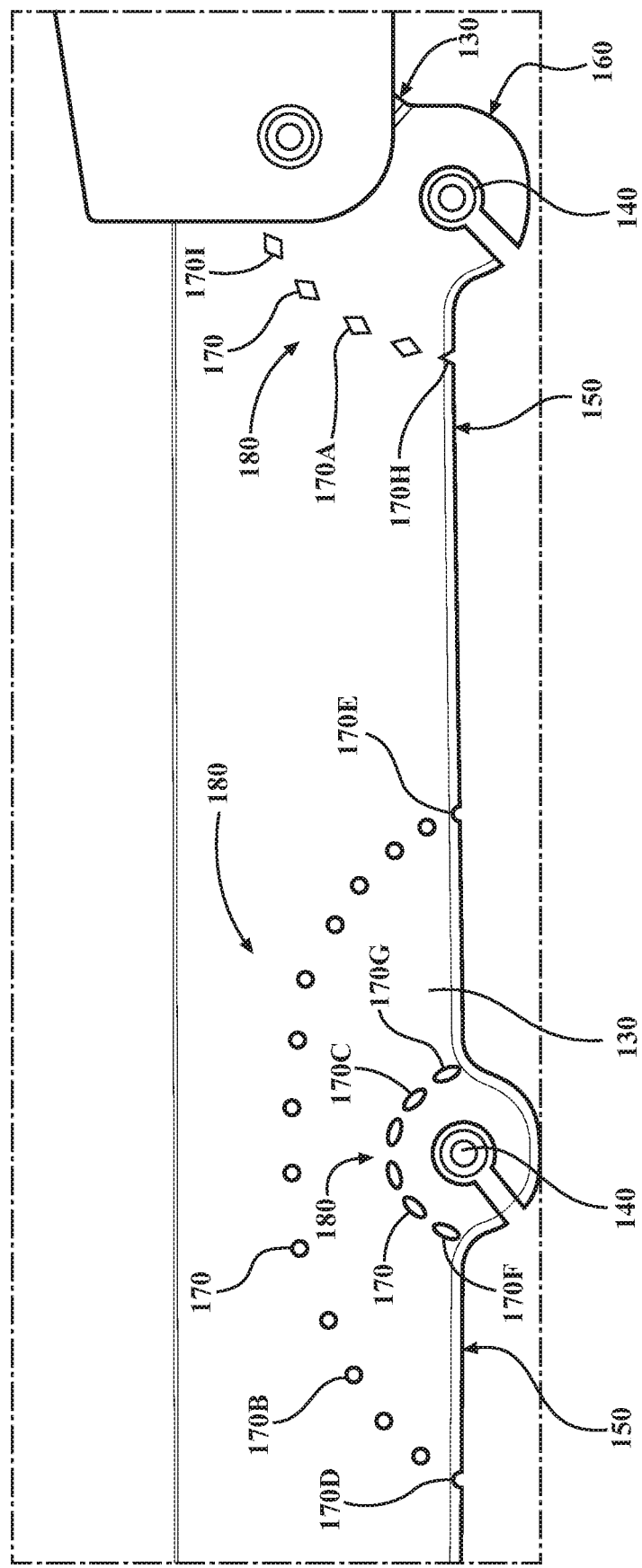
FIG. 5 a further magnified view of a portion of the back side of the door trim panel assembly of FIG. 3, highlighting weakened perimeters around attachment points of a trim panel according to various aspects of the present technology.

FIG. 4 shows a magnified view of a portion of the back side of the door trim panel assembly 120 of FIG. 3B and FIG. 5 is a further magnified view of a portion of the back side of the door trim panel assembly 120 of FIG. 3. With continued reference to FIG. 3B, as well as to FIGS. 4 and 5, the trim assembly 120 also includes at least one attachment point 140. An attachment point 140 defines a discrete point, generally circular or quasi-circular, in the first and second trim panels 130, and at which the first and second trim panels 130 are attached to one another. The attachment point 140 thus includes an attachment mechanism for maintaining the first and second trim panels 130 in contact with one another at the attachment point 140. Such an attachment mechanism can include, without limitation, a heat stake, a screw, a clip, or any other structural or mechanical fastener or other mechanisms suitable for maintaining the first and second trim panels 130 in contact with one another at the attachment point 140. With particular reference to FIG. 5, the attachment point 140 will generally be positioned adjacent to at least one panel edge 150. In some implementations, the attachment point 140 will be positioned adjacent to two panel edges 150, by being positioned in a corner 160 of the trim panel 130.

The trim assembly 120 also includes a plurality of apertures 170 intentionally defined at strategic locations in at least the first trim panel 130. The plurality of apertures 170 define a weakened perimeter 180 around the attachment point 140 that is located in the first trim panel 130. The weakened perimeter 180 constitutes a controlled breakaway section in the first trim panel 130 around the attachment point 140, at which the first trim panel 130 is designed to break and the trim assembly 120 will separate if a load exceeding a threshold value is applied to the trim assembly 120. It will be appreciated that such a threshold value can correspond to a load that would be likely to be exceeded during a vehicle collision, but unlikely to be exceeded by a vehicle occupant during normal use.

Figure 6:
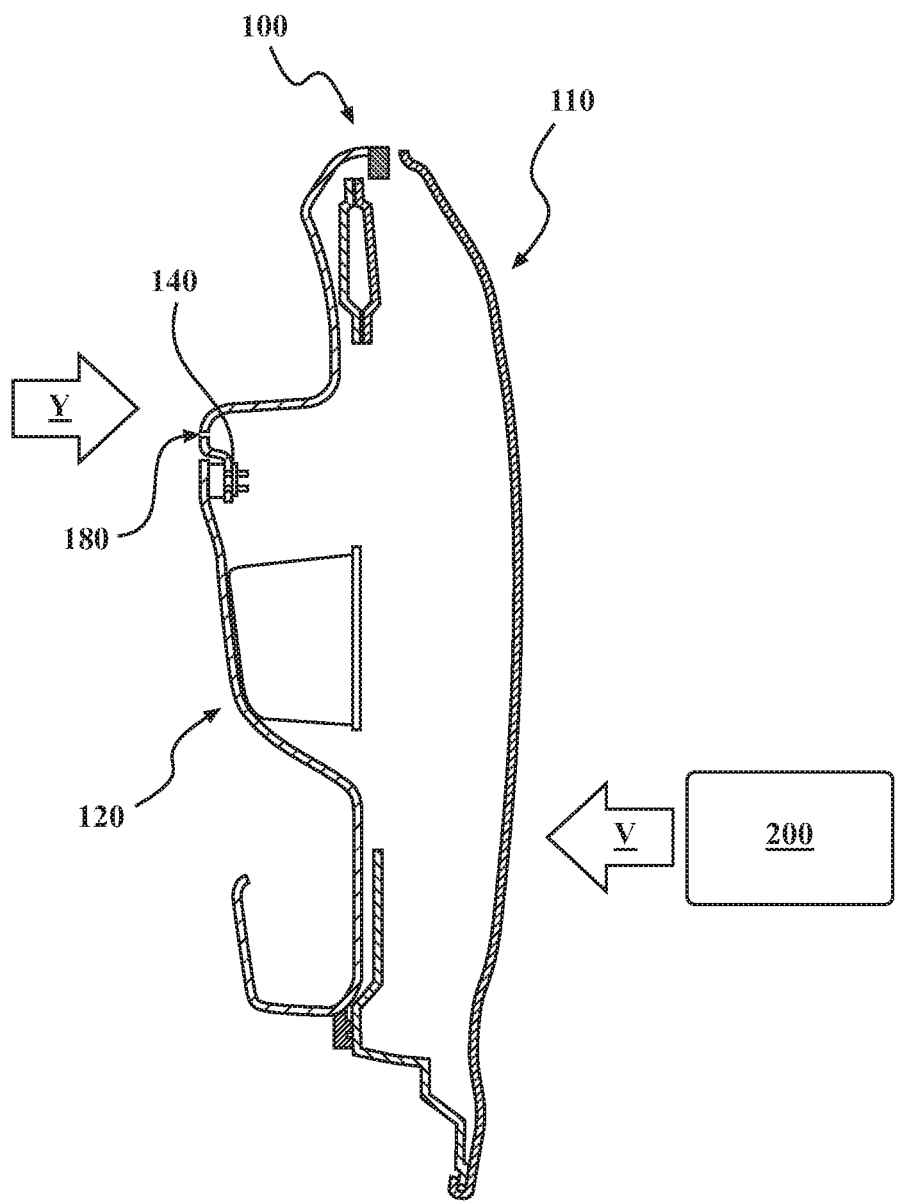
FIG. 6 is a cross sectional view of the door as shown in FIG. 2, illustrating the application of an external load that separates the door trim panel assembly into upper and lower portions.

Thus, the weakened perimeter 180 facilitates creation of a pre-determined breakaway adjacent to the attachment point 140, facilitating greater predictability and control of the manner in which the trim assembly 120 will break when strained by a load, such as during an impact or vehicle collision. FIG. 6 shows a cross sectional view of the door as shown in FIG. 2, illustrating the application of an external load, V, directed from outside the vehicle. When the external load V is applied to the vehicle door 100, such as the fender 200 of another vehicle colliding with the door 100, this can urge the door 110, including the trim panel assembly 120, toward the vehicle interior. An opposing load, Y, may be applied at or near the weakened perimeter 180 present in the first panel trim panel 130 of the trim assembly 120 when the inward moving trim panel assembly 120 strikes an object in the vehicle interior. The trim assembly 120 can then break and separate at the weakened perimeter 180, preferentially leading to the result that the upper portion 120B ceases moving toward or applying force to the vehicle occupant.

The weakened perimeter 180 surrounding the attachment point 140 can, in different implementations, be arcuate, a straight line, or a combination of angled straight lines. In some implementations, the weakened perimeter 180 can be concentric with the attachment point 140. The weakened perimeter 180 can be characterized by an average distance of separation between each of the apertures in the plurality of apertures 170 and the attachment point 140. In various implementations, the average distance of separation between the plurality of apertures 170 and the attachment point 140 can be one centimeter, or two centimeters, or three centimeters, or four centimeters, or five centimeters, or six centimeters, or seven centimeters, or eight centimeters, or nine centimeters, or ten centimeters. In some implementations, all of the apertures in the plurality of apertures 170 will be equidistant from the attachment point.

The weakened perimeter can further be characterized by the spacing of the apertures 170, or the distance of separation between each of the apertures 170 in the plurality of apertures 170. In different implementations, the distance of separation between each of the apertures in the plurality of apertures can be within a range of 1 mm to 1 cm or from 1 mm to several cm. While the apertures 170 in the plurality of apertures can be evenly spaced relative to one another, they need not necessarily be so. The weakened perimeter can further be characterized by the shape of the apertures 170, and the maximum dimension, or the size, of the apertures 170. When the apertures 170 are non-circular, the weakened perimeter can further be characterized by the rotational orientation of the apertures. In many implementations, all apertures 170 in the plurality of apertures will have the same shape and the same size, or maximum dimension.

In different variations, and with continued reference to FIG. 5, the shapes of the apertures 170 can be tuned to create a desired strength or weakness of the weakened perimeter 180. For example, triangles, squares, rectangles, diamond (e.g. rhombus or parallelogram) 170A teardrop shapes, or any other shape having at least one angled edge, can be used to create very sharp stress concentrations to direct the crack propagation. In general, it will be desirable to orient such apertures so that the angle defining the angled edge has a bisector pointing in the desired direction of crack propagation. For a stronger panel 130, circles 170B, ellipses 170C, or other shapes lacking an angled edge can be used. A weakened perimeter will generally have two terminal apertures 170D, 170E 170F, 170G, 170H. A terminal aperture is an aperture 170 at an end of a weakened perimeter that is nearest to an edge 150 of the trim panel 130. In some instances, such as terminal aperture 170C, a terminal aperture will intersect a panel edge 150, causing an indentation in the panel edge 150, the indentation corresponding to a partial aperture shape. In other instances, such as terminal aperture 170F, a terminal aperture will not contact the edge 150. Such variations in the terminal apertures can also be used to tune the weakness or durability of the weakened perimeter 180.

Figure 7:
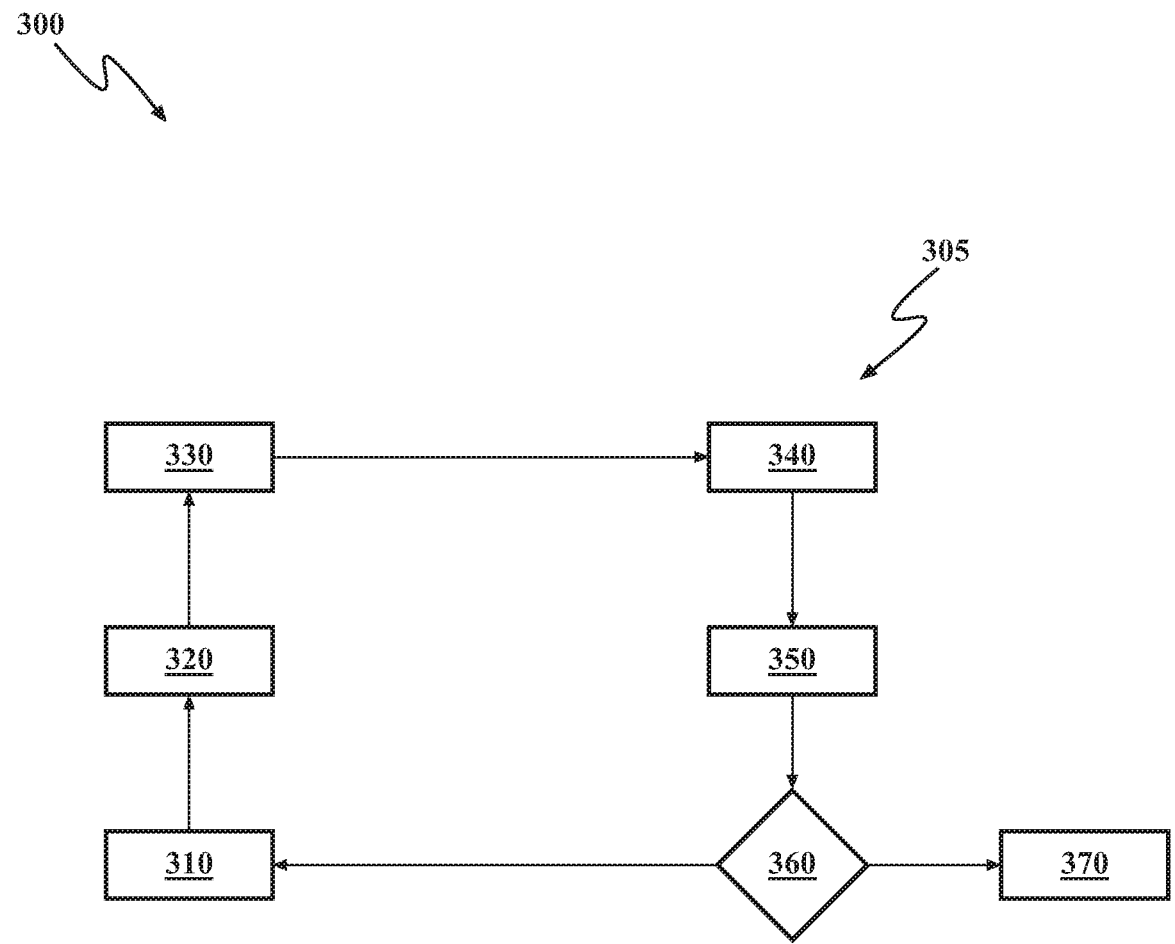
FIG. 7 is a flow chart of an exemplary method for tuning the durability of a pre-determined breakaway line on a trim panel.
Figure 8A:
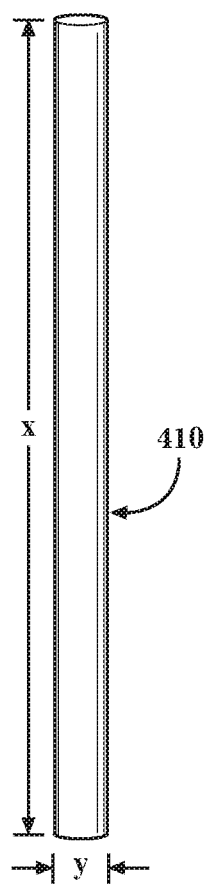
FIGS. 8A and 8B are perspective views of different shapes of pins that can be used in the method of FIG. 7.
Figure 8B:
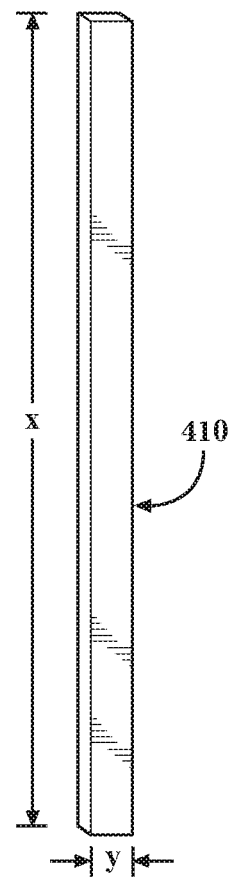

With reference to FIG. 7, a method 300 for tuning the durability of a pre-determined breakaway line on a trim panel 130 for a vehicle is also disclosed. The method 300 includes a repeatable cycle 305 that can be repeated any desired number of times, including zero. Thus in some implementations, the repeatable cycle 305 be unrepeated, or performed only a single time. The repeatable cycle includes a step of selecting 310 a plurality of pins 410 for forming apertures 170 in the trim panel 130. The pins 410 can be selected 310 on the basis of size, shape, or both. With reference to FIGS. 8A and 8B, a pin 410 will generally have a maximum longitudinal dimension, x, and a maximum lateral dimension, y. The maximum lateral dimension, y, will typically be within a range of from about 100 µm to about 10 mm, inclusive. In some implementations, the maximum lateral dimension, y, will be within a range of from about 1 mm to about 5 mm, inclusive.

A pin 410 will generally have a cross sectional shape, the cross sectional shape corresponding to an internal, lateral cross section, C, that is perpendicular to the maximum longitudinal dimension, x, and parallel to the maximum lateral dimension, y. In many implementations, a pin 410 will have identical cross sectional shape across most or all of the maximum longitudinal dimension, x. In some implementations, a pin can be tapered such that the size of the cross sectional shape decreases along the maximum longitudinal dimension, x. In general, the pins 410 will be selected 310 on the basis of the geometry of the cross sectional shape. In some, but not necessarily all, implementations, all pins 410 selected 310 in the plurality will be substantially similar to, if not identical to, one another.

The repeatable cycle 305 can include a step of choosing 320 a perimeter pattern corresponding to a desired geometric pattern of the weakened perimeter 180 in the trim panel 130. The chosen perimeter pattern can therefore have the same geometric features as those of the weakened perimeter 180, as described above, including that the perimeter pattern can be arcuate, a straight line, or a combination of angled straight lines.

Figure 9A:
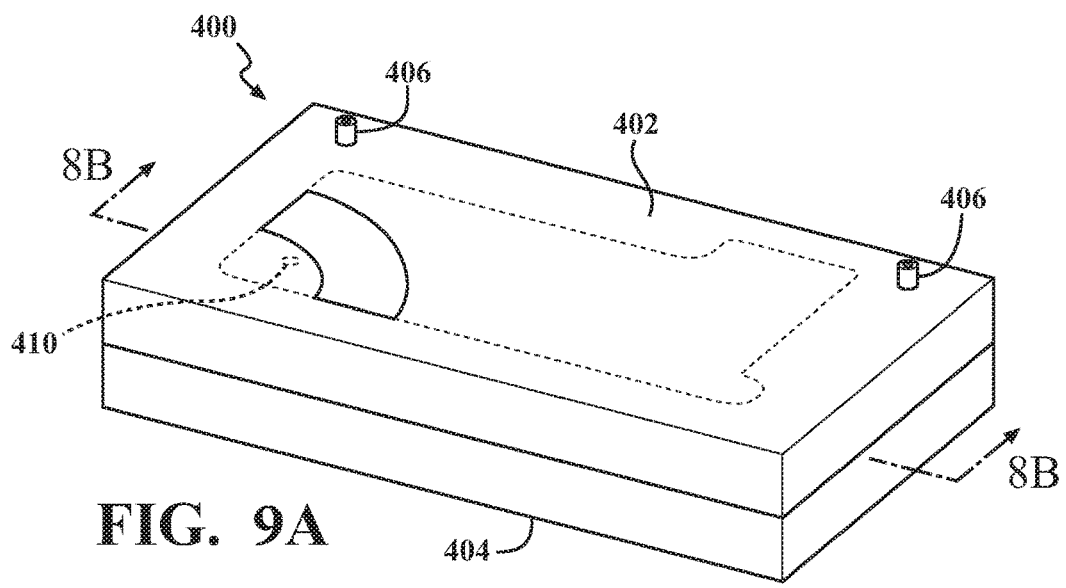
FIG. 9A is a perspective view of an injection mold that can be used in the method of FIG. 6.
Figure 9B:
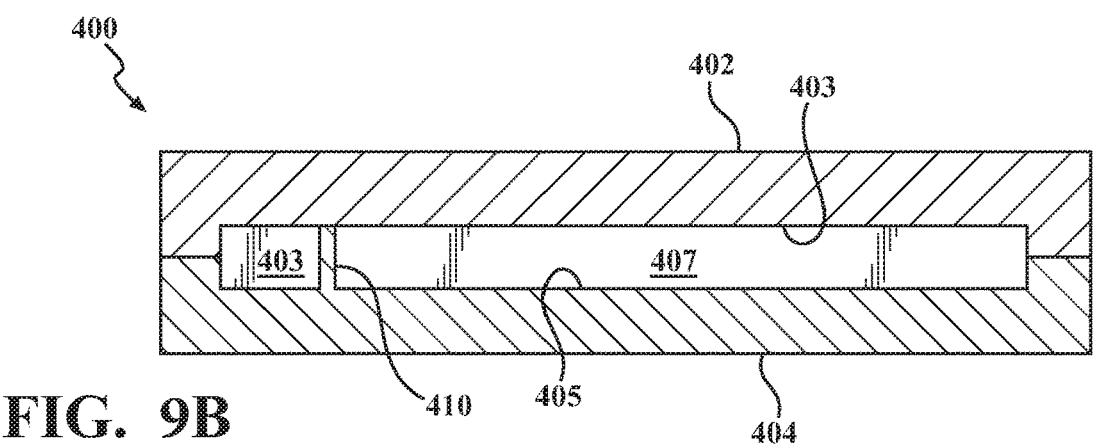
FIG. 9B is a cross-sectional view of the mold of FIG. 9A, taken along the line 9B-9B.
Figure 9C:
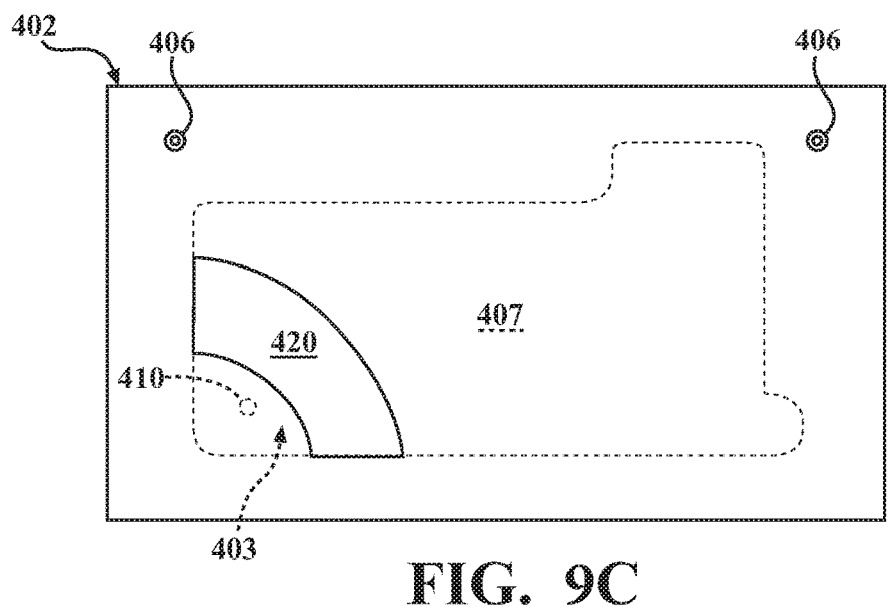
FIG. 9C is a plan view of a top plate of the mold of FIG. 9A, highlighting an adjustable pin placement.

FIG. 9A is a perspective view of an injection mold 400 that can be used in the method of FIG. 6; FIG. 9B is a cross-sectional view of the mold 400 of FIG. 9A, taken along the line 9B-9B; and FIG. 9C is a plan view of a top plate 402 of the mold 400 of FIG. 9A. The exemplary mold 400 if formed of two mold plates 402, 404 and includes inlet/outlet ports 406 for injection of molten material. When the two mold plates 402, 404 are coupled, interior surfaces 403, 405 define the internal cavity 407 which defines the shape of the panel 120 to be formed.

With continued reference to FIG. 7, and to FIGS. 9A-9C, the repeatable cycle 305 further includes a step of inserting 330 the pins 410 into the mold 400 according to the perimeter pattern 450. In some implementations, this will require that the mold 400 have an adjustable pin placement region 420, as shown in FIGS. 9A and 9C. The adjustable pin placement region 420 is a region integrated into either or both of the first and second plates 402 that is able to receive and hold one or more pins 410 at a variety of locations during the inserting 320 step. The location for inserting each pin can be selected multiple possible locations. Stated alternatively, two molds 400 that are identical to one another prior to the inserting 320 step, and that have an adjustable pin placement region 420, would be able to accommodate different perimeter patterns.

In some implementations, an adjustable pin placement region 420 can include a two-dimensional array of holes, each defining a potential pin placement. Generally, during a single performance of the repeatable cycle 305, some but not all of the potential pin placements will be used. In such implementations, a pin placement that is not to be used can be filled with a blank that plugs the hole but does not extend through the internal cavity 407, while a pin placement that is to be used can be filled with a pin 410, thereby forming an aperture 170 in the panel 130 at that position.

In some implementations, the adjustable pin placement region 420 can include a removable insert. Pin placements can be drilled or otherwise formed at desired locations in the removable insert to form the perimeter pattern. If a subsequent performance of the repeatable cycle 305 is desired, the used removable insert can be replaced with an unused removable insert, into which holes can be drilled or otherwise formed at different positions and/or with different shapes or orientations, to define a new perimeter pattern.

In many implementations, the mold 400 can include an attachment point forming portion 430, such as a pocket configured to form a stake, or a protrusion configured to form a stake hole, during injection molding. In some such cases, the perimeter pattern can be concentric with the attachment point forming portion 430. The perimeter pattern can be characterized by an average distance of separation between each of the pins 410 and the attachment point forming portion 430. In various implementations, the average distance of separation between each of the pins 410 and the attachment point forming portion 430 can be one centimeter, or two centimeters, or three centimeters, or four centimeters, or five centimeters, or six centimeters, or seven centimeters, or eight centimeters, or nine centimeters, or ten centimeters. In some implementations, all of the pins 410 will be equidistant from the attachment point forming portion 430. The perimeter pattern can further be characterized by the spacing of the pins 410, the distance of separation between each of the pins 410, or the rotational orientation of the pins when a lateral cross-section of the pins is non-circular.

The repeatable cycle 305 includes a step of injection molding 340 the trim panel 130 by injecting a molten thermoplastic resin into the mold 400, after completion of the inserting 320 step. The injection molding 340 step produces a trim panel 130 having apertures 170 forming a weakened perimeter 180 corresponding to the perimeter pattern as discussed above.

The repeatable cycle 305 includes a step of testing 350 the trim panel 130 for a desired break property. For example, the trim panel 130 can be incorporated into a vehicle door 100 as part of a trim assembly 120, and the door 100 can be tested in a vehicle side impact test. The trim assembly 120 can be monitored to determine whether it breaks or releases at a desired position, such as along the perimeter 180 of the trim panel 130. The repeatable cycle 305 then includes a step of determining 360 whether to repeat the cycle 305. In certain implementations, the determining 360 step can be performed by comparing the testing 350 results to a predetermined threshold criterion. For example, if the testing 350 shows that the current panel 130 iteration is within a threshold distance of a desired location and/or within a threshold value of a desired applied force, than it can be determined 360 that the repeatable cycle 305 is not to be repeated. As described above, the desired force can be such that it is likely to be exceed during a vehicle collision but unlikely to be exceeded by a vehicle occupant during normal use. Thus it will be appreciated that the disclosed method 300 for tuning the durability of a pre-determined breakaway line on a trim panel is advantageously suited to designing a trim panel that is robust for normal use and weakened to a desired degree and location for potential high duress events such as side impact testing or other collisions.

If the current panel 130 iteration does not meet the threshold criteria, then it can be determined 360 that the repeatable cycle 305 is to be repeated. The repeatable cycle 305 can be repeated any number of times, varying the geometry of the pins 410 and/or the perimeter pattern 450 until the testing 340 step reveals a design of the trim panel 130 that produces the desired results. The method 300 includes a step of selecting 370 the trim panel 130 design that produces the desired results. As shown in FIG. 7, a trim panel 130 design will be selected 370 when it is determined 360 that the repeatable cycle 305 should not be repeated.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A method for tuning durability of a controlled breakaway section on a trim panel, the method comprising:
   a repeatable cycle, the repeatable cycle comprising:
      selecting a plurality of pins for forming apertures in the trim panel;
      choosing a perimeter pattern corresponding to a desired geometric pattern of the controlled breakaway section in the trim panel;
      inserting the pins into a mold, the mold having adjustable pin placements configured to receive and hold a pin at a location that can be selected, during the insertion step, from multiple possible locations, according to the perimeter pattern;
      injection molding the trim panel by injecting a molten thermoplastic resin into the mold; and
      testing the trim panel for a desired break property; and
   selecting the trim panel having the perimeter pattern that yields the desired break property.

2. The method as recited in claim 1, wherein each adjustable pin placement includes a resilient fastener positioned within an opening.

3. The method as recited in claim 1, wherein each adjustable pin placement includes an adjustable fastener positioned within an opening.

4. The method as recited in claim 1, wherein the adjustable pin placements comprise a removable insert into which pin placements can be drilled or otherwise formed.

5. The method as recited in claim 1, wherein the mold includes an attachment point forming portion configured to form an attachment point during the injection molding step, the attachment point configured to attach the trim panel to a second trim panel.

6. The method as recited in claim 5, wherein the perimeter pattern is characterized by an average distance of separation between each of the pins and the attachment point forming portion, and the average distance of separation is less than about five centimeters.

7. The method as recited in claim 5, wherein the perimeter pattern is characterized by each of the pins being equidistant from the attachment point forming portion.

8. The method as recited in claim 5, wherein the mold is characterized by a first edge and a second edge adjacent to the attachment point forming portion, and the perimeter pattern extends completely from the first edge to the second edge.

9. The method as recited in claim 8, wherein the first edge is substantially perpendicular to the second edge, and the attachment point is located at the intersection of the first and second edges.

* * * * *